Figure 17:
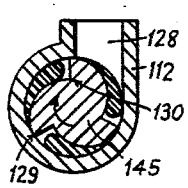

July 20, 1965 J. CARTON ETAL 3,195,178
APPARATUS FOR THE TREATMENT OF PLASTIC MATERIALS
Filed Aug. 1, 1961 3 Sheets-Sheet 1
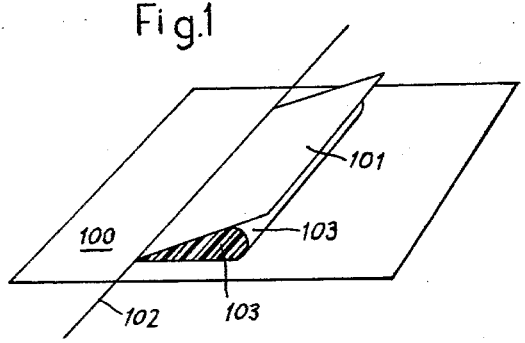
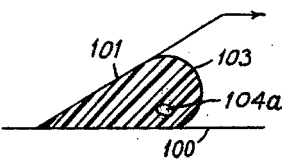
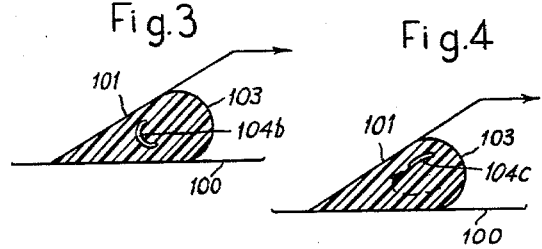
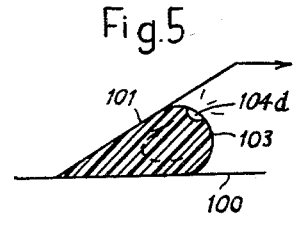
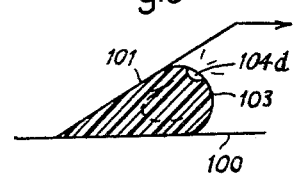
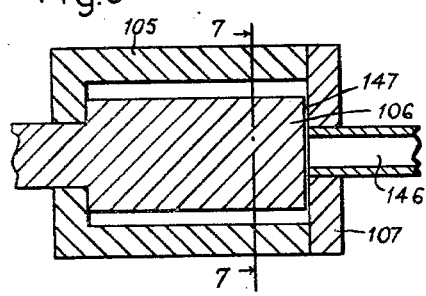
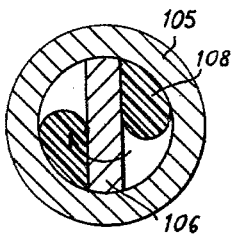
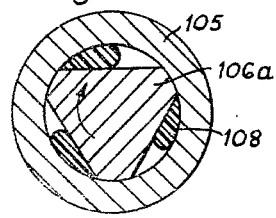
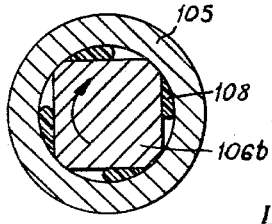

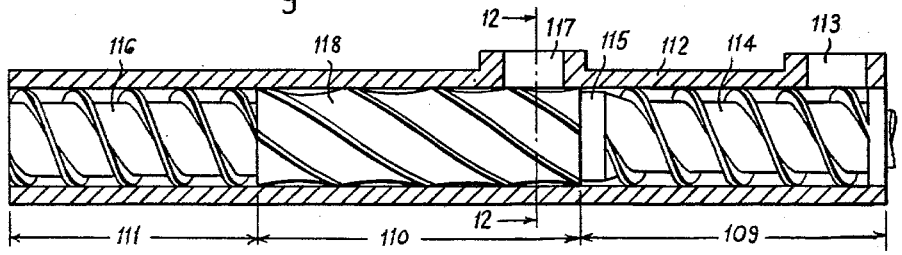
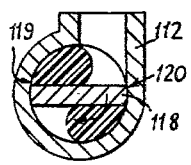 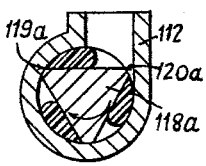 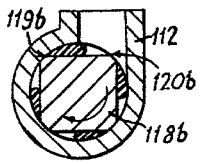 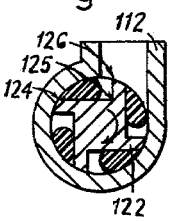
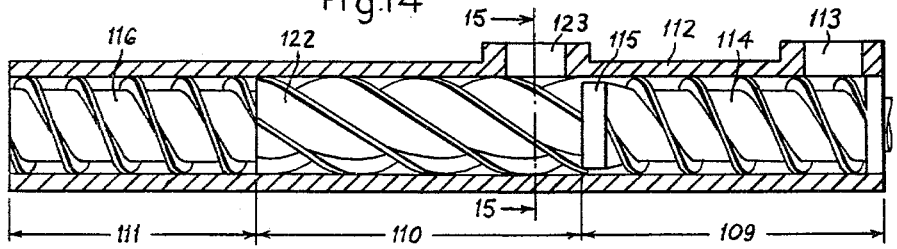
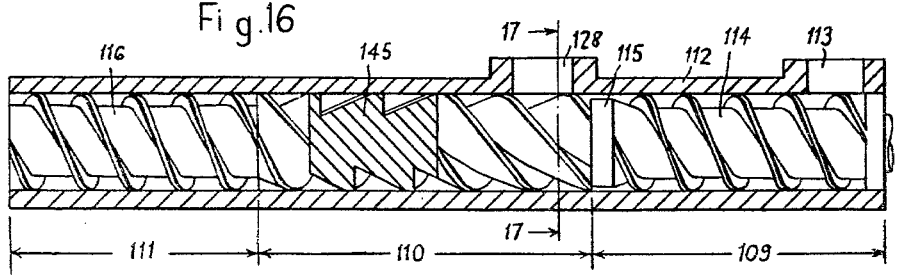

July 20, 1965    J. CARTON ETAL    3,195,178
APPARATUS FOR THE TREATMENT OF PLASTIC MATERIALS
Filed Aug. 1, 1961    3 Sheets-Sheet 3

Inventors
Jean Carton
Jean Feytis
Pierre Fouquet
By Stone & Mack
Attorneys.

United States Patent Office 3,195,178
Patented July 20, 1965

3,195,178
APPARATUS FOR THE TREATMENT OF PLASTIC MATERIALS
Jean Carton, Paris, and Jean Feytis and Pierre Fouquet, Bohain (Aisne), France, assignors to Compagnie Francaise Thomson-Houston, Paris, France
Filed Aug. 1, 1961, Ser. No. 128,465
Claims priority, application France, Aug. 10, 1960, 835,527
9 Claims. (Cl. 18—2)

The present invention relates to an apparatus for processing plastic materials which are under the conditions of production purely viscous or visco-elastic; and also to a type of machine suitable for processing the said materials.

It is known that the mixtures based on elastomers or on thermoplastic or thermosettable synthetic resins prepared in mixers of different types which are well known in the rubber and plastic-materials industry may present occlusions of air, traces of moisture and/or components which are volatile under certain conditions of temperature and/or of pressure.

The thermal treatments necessary for putting these mixtures into their final form (for example, vulcanization), even when carried out with concomitant application of a certain pressure (realized either with steam or by molding in a press) impart to the obtained products a more or less spongy structure. The proof of this is that the theoretical density, calculated on the basis of the density of each of the components, is never attained in practice.

It is an object of this invention to provide products whose density will be as close as possible to the theoretical density. Another object is to apply to the mixtures suitable thermal treatments (such as vulcanization) without application of any pressure, thereby contributing a worthwhile simplification in comparison with the previous techniques.

In brief, the invention provides an apparatus which enables separation and removal from plastic materials of all gases and components which are volatile under the conditions of processing. It is thus possible to rid the viscous or visco-elastic materials of the gases or volatile inclusions which usually impart a heterogeneous structure to the finished products produced from the said materials.

This method and apparatus for carrying it out are based on the discovery by the applicant of the facts which will hereinafter be described and resulting from the combination under rarefied atmosphere of a thermal action and a mechanical action.

An object of the invention is to provide plastic material degassing apparatus which is new, simple, cheap and robust.

A further object of the invention is to provide apparatus for the continuous processing of plastics including the application of degassing thereto.

The term "plastic materials" as used herein and in the claims is to be deemed as including any viscous polymeric compositions, including resins, elastomers, ceramic pastes and the like.

In order that the invention and its advantages may be more fully understood, there will now be described, by way of example and with reference to the accompanying drawings, some embodiments of the improved degassing apparatus, it being understood that these examples do not have any limiting character with respect to the mode of carrying out the invention or to the applications to which it may be put, especially those concerning the treatment of ceramic pastes.

Figure 19:
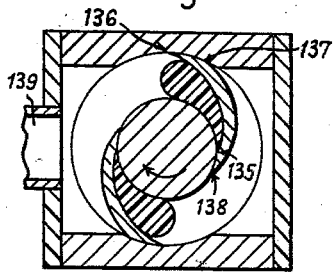
Figure 18:
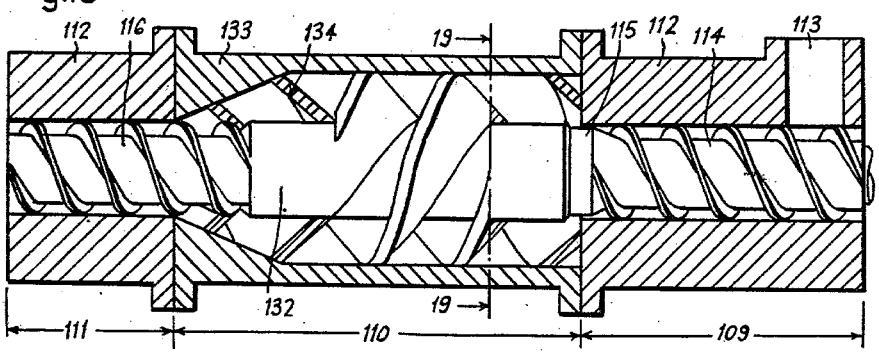
Figure 20:
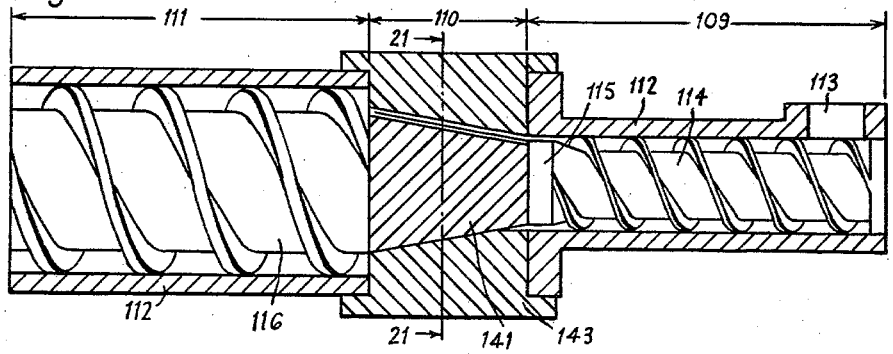
Figure 21:
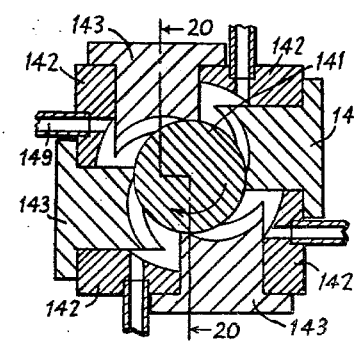

In the drawings:
FIGURES 1 to 5 illustrate the principle of the invention;
FIGURE 6 is an elevational section of one embodiment of apparatus;
FIGURES 7, 8 and 9 are alternative cross-sections for the apparatus of FIGURE 6, all taken on line 7—7 of FIGURE 6;
FIGURE 10 is an elevational section of another embodiment;
FIGURES 11, 12 and 13 are alternative cross-sections for the apparatus of FIGURE 10, all taken on the line 12—12 of FIGURE 10;
FIGURE 14 is an elevational section of a further embodiment;
FIGURE 15 is a cross-section of the embodiment of FIGURE 14 on line 15—15 of FIGURE 14;
FIGURE 16 is an elevational section of yet another embodiment;
FIGURE 17 is a cross-section of FIGURE 16 on line 17—17 thereof;
FIGURE 18 is an elevational section of a further embodiment;
FIGURE 19 is a cross-section of FIGURE 18 on line 19—19 thereof, and
FIGURES 20 to 23 are views of yet another embodiment; FIGURES 20 and 21 being cross-sections taken on line 20—20 of FIGURE 21 and on line 21—21 of FIGURE 20 respectively.

In FIGURE 1 there is shown in hatching a bead 103 of plastic material pressed between a plane surface 100 and a so-called "scraper surface" 101, travelling across the surface 100, the scraper surface being limited by a straight line 102 in the plane 100.

The scraper surface 101 is moved relatively to the plane surface 100 in the manner of a scraper or putty knife blade. This movement produces a wedging or squeezing of the bead 103, along the straight line 102.

According to a preferred aspect of the invention the coefficient of friction of the material with respect to the scraper surface 101, must be smaller than the coefficient of friction of the material with respect to the plane surface 100. By reason of these arrangements, there is produced a rolling and kneading movement in the bead, whereby each elementary volume thereof is subjected in succession to (a) a displacement until it reaches the free surface 103 of the bead; and (b) at the free surface, a stretching of the material which bursts the bubbles and occluded gases and vapors present in the material.

For illustrating this action there are shown in FIGURES 2, 3, 4 and 5, the successive positions with passage of time of an elementary volume initially located at 104a in the interior of the bead. This volume encloses a bubble of gas or a component which becomes volatile under the action of heat and/or vacuum. This bubble passes through the positions 104b, 104c and finally reaches the free surface of the bead at 104d where it bursts.

For obtaining equivalent results it is clear that the planar surfaces 100 and 101 may be replaced with other surfaces, provided that the following three conditions are fulfilled:

Condition A

The material, in the form of a viscous or visco-elastic bead must be squeezed between two active surfaces in relative movement and maintaining a line of angular contact in such a way that the material undergoes a decreasing wedging action from the line of angular contact of the surfaces to the free surface of the bead. In other words, a steep negative pressure gradient must be present as from the innermost portions of the bead adjacent the line of contact, where a high pressure obtains, to the free surface of the bead, where subatmospheric pressure is maintained. For this purpose the two active surfaces must diverge from their line of contact in order not to recompress the material.

Condition B

During movement, the bead must always present to the subatmospheric atmosphere a "free" surface and hence without contact with the solid parts of the machine.

Condition C

The so-called scraper surface draws the bead along with it and it is essential that the coefficient of friction of the material against the scraper surface be smaller than the coefficient of friction of material against the other or base surface. This differential between the coefficients of friction may be obtained through one or more of the following means:

(1) Different materials;
(2) Different surface conditions;
(3) Different surface temperatures.

Some embodiments satisfying conditions A, B and C are shown in FIGURES 6 to 9. FIGURE 6 represents the longitudinal section common to the three embodiments shown in cross-section in FIGURES 7, 8 and 9. These latter figures show the section of the plane scraper surface and the other cylindrical active surface executing a relative movement under rarefied atmosphere. There may be a clearance of the order of, for example, $1/10$ mm. between the surfaces.

In FIGURES 6 and 7 there is seen a recessed cylindrical body 105, within which is rotatably mounted, by suitable means not represented, a prismatic body 106 providing the scraper surfaces. The body 105 is in communication via an opening 146 with a vacuum pump. A clearance space 147 is provided between the inner body 106 and an end closure member 107 closing the body 105 at one of its ends.

The body defining the scraper surfaces, pressing the bead 108, may be formed of other polygonal shapes as shown at 106a and 106b in FIGURES 8 and 9 respectively.

The arrangements for controlling the pressure and/or the temperature, as well as the corresponding actuating means, are not shown. These may comprise the usual arrangements well-known for use with these techniques, such as electric resistances, fluid circulating coils, fins, etc.

The location of the vacuum connection is not critical. It may be located at any place not covered by the bead of material. Another aspect of the invention resides in the possibility of incorporating it in a continuous production process. For this purpose the arrangements according to the present invention must satisfy conditions A, B and C as set forth above, and, in addition, a condition D as set forth below.

Condition D

The performance of a continuous process requires the existence in the apparatus of three successive sections. Namely:

(a) A feeding section serving to supply to the following section the material in viscous or visco-elastic phase at a prescribed rate of delivery and at a prescribed temperature.

(b) A special processing section for the extraction and entrainment of the volatile components, according to the present invention, satisfying together conditions A, B and C and that of replenishment of the material.

(c) An output section which receives the product of the processing section and delivers it to the intended utilization apparatus.

Sections (a) and (c) may consist of any known arrangement such as used in presses, molders, etc. Thus, gravity feed means, auger screw feeders, and the like, may be used. Auger screws are particularly convenient and hence preferred.

Thus, any of the arrangements of FIGURES 6 to 9 can satisfy condition D above if it maintains a vacuum and if it is provided with two orifices respectively connectable with a feeding- and an outlet-section and the material is replenished either by gravity or by pressure or by any other equivalent effect.

This aspect of the invention is illustrated by several nonlimiting embodiments shown in FIGURES 10 to 23.

The various arrangements for measuring and regulating the temperatures and/or vacuums are not shown on these figures, since these may constitute known arrangements customarily employed in related techniques.

Each of the five embodiments to be described comprises a similar feeding section and a similar output section. The feeding section comprises in each case a feed screw or auger 114 fed conventionally through an opening 113 in the body 112. This screw is rotatable relatively to the body 112. Such a section terminates in a delivery-limiting portion which can be realized by any known arrangement, for example, it can take the form of an annular constriction between the body 112 and an enlargement 115 of the shank of the screw.

The output section 111 comprises in each of the five embodiments a conventional auger or feed screw 116 rotatable in the body 112. It evacuates the treated material from section 110 and extrudes it through a conventional extrusion head (not shown). This section is filled with the material which is recompressed therein.

There is shown in FIGURE 10 the elevational section of a type of feeder which comprises a screw whose portion located in section 110 has a special thread 118, described below. Processing section 110 for extracting the gaseous bodies is in communication with the vacuum pump through an opening 117 in the body 112. The scraper surfaces driving the beads of material are helicoidal, and the cross section of one of these scraper surfaces is the straight segment 119–120, as shown in FIGURE 11 or 12 or 13. Accordingly any polygon can constitute the cross section of the processing section of such a screw provided the wedging angle is suitable for the material to be treated. The other or base surface is constituted by the cylinder of revolution which limits the body of the feeder internally.

Conditions A and B are fulfilled only if the bead does not extend into the region of the straight segment 119–120 defining the cross section of each helicoidal surface. For this purpose the delivery rate of the feeding section is adjusted to a value low enough to ensure that the bead of material will not completely fill the channels in the processing section, but will leave a free surface to the bead. Condition C is realized, for example, by chroming the screw surfaces to reduce the friction coefficient between it and the processed material. The employment of a helicoidal scraper surface ensures the feed and replenishment of the material in section 110. Thus condition D is fully satisfied.

A preferred variation of the apparatus is shown in FIGURES 14 and 15. The general arrangement is the same as in FIG. 10. The cross-section of the screw in processing section 110 is shown in FIGURE 15.

The scraper surface driving each of the beads again is a helicoidal surface whose cross section is a straight segment 124–125. In this case there are provided four of these surfaces disposed swastika-fashion as shown in FIGURE 15. With each of these surfaces there is associated for limiting the volume offered to the bead a helicoidal portion having a straight cross section 125–126 cutting the helicoidal scraper surface at a right angle.

Another embodiment of the apparatus is shown in FIGURES 16 and 17. The general arrangement is the same as in FIGS. 10–15. The scraper surface driving each of the beads of material is a helicoidal surface whose cross section is for facilitating machining operations, a portion 129–130 of an Archimedean spiral (FIGURE 17).

The screw has two of these scraper surfaces (which are displaced 180 deg.). The other or base surface is constituted by the cylinder of revolution which limits the body of the feeder internally.

Another modification is shown in FIGURES 18 and 19. The general arrangement again is similar to that of the foregoing embodiments.

The processing section comprises a rotatable cylindrical part 132, connected with the feed screw 114 and a stationary enclosure part 133. The scraper surface, here stationary, is a regular helicoidal surface 134 whose cross section is, for facilitating machining operations, a portion 135–136 of Archimedean spiral (FIGURE 19). The other or base surface is the rotatable cylindrical surface 132. The pitch of the helix is reverse from the screw pitches of the two other sections 109 and 111. Each scraper surface is formed on a flange having, for example, the form 135, 136, 137 and 138 visible in FIGURE 19. One or more such flanges may be secured to the body 133 of the feeder, either by welding, as indicated in the figures, or by any other means, such as bolting, riveting, etc. The processing section is in communication with a vacuum pump through one or more openings 139 in the body of the feeder. The arrangement shown in FIGURE 19 avoids presentation of the bead of material between the vacuum connections and thus wholly eliminates the danger of the material being drawn out therethrough.

Conditions A and B are satisfied to the extent that the delivery rate of the feeding section produces a bead which is practically limited to the portion 135–136 of the helicoidal surface. Under these conditions the bead presents a free surface to the vacuum.

Yet another embodiment of the invention is shown in FIGURES 20 to 23.

Figure 22:
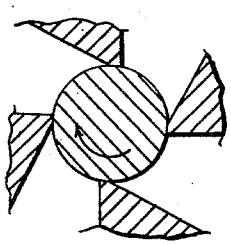

The processing section comprises a frusto conical rotor 141 connected with the feed screw 114 and a stationary enclosure part 142 (FIGURE 21) connected with the body 112. To this stationary part 142 are connected shoes 143, each of which presents to the truncated cone 141 a scraper surface constituted, for example, by a portion of a conical surface, of the same apex as the truncated cone 141, whose base is, for example, a spiral portion in the plane of the large base of the truncated cone (FIGURE 21). The base surface which cooperates with the scraper surface is the rotatable truncated cone 141, with which it is in contact along a generatrix. This surface may alternatively be a cylindrical surface with generatrices parallel with the generatrix of contact or any other surface (as shown in FIGURE 22), adapted for fulfilling condition A. The feeding section has its delivery rate regulated in such a way that the bead always satisfies conditions A and B.

Figure 23:
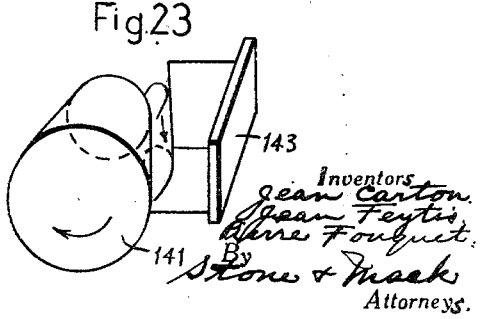

FIGURE 23 shows schematically the action on the bead of arrangements of this type.

Condition D is realized when the material is introduced from the small base of the truncated cone.

The vacuum is connected at one or several points 149 of the body of the feeder outside of the path of movement of the beads of material. This arrangement presents the important advantage of avoiding pressing of the material out through the vacuum connection.

In all of the embodiments described and shown, the teaching of the invention regarding the differential friction coefficients between the two surfaces and the material being processed (condition C as defined hereinabove) may be fulfilled in any of various ways. For imparting the lower frictional characteristic to the scraper surface, said surface may be chrome-plated (as mentioned in respect to certain of the embodiments) or it may be made of a suitable grade of metal having a substantially smoother surface condition than the cooperating surface.

The apparatus of the screw type shown in the drawings may have dimensions similar to those of conventional feeders of the same screw diameter. The addition of the special processing section according to this invention does not lower the output compared with the conventional feeders of the same screw diameter.

Although the five latter described embodiments have feeding- and output-section arrangements of the auger type, it is to be understood that within the scope of the present invention there could also be employed presses or any other arrangement suitable for continuous production.

We claim:

1. Apparatus for processing plastic materials, comprising a sealed enclosure, and means defining an input section, a processing section and an output section in series relation lengthwise of the enclosure; means defining relatively movable surfaces in said processing section in mutual engagement along a line of angular contact to define generally longitudinal channel means of uniform angularity in cross section through the processing section. One of said surfaces defining a continuous backing surface and the other a vaned scraper surface; said scraper surface having a substantially lower friction coefficient than said backing surface with respect to said material; an opening in said processing section communicating with said channel means and means connecting the opening with a reduced pressure source; means for feeding material to said input section through said processing section and for withdrawing processed material from said output section at relative rates so predetermined that the material does not completely fill the processing section; and means for continuously imparting relative movement to said surfaces during material feed; whereby said material will be subjected in said processing section to a steep negative pressure gradient and an accompanying rolling and kneading action due to differential friction against said surfaces for positively expelling gaseous inclusions from said material as they are presented to said vacuum.

2. Apparatus as claimed in claim 1, wherein said opening is formed in an area of said surfaces not accessible to said material during feed thereof through the processing section.

3. Apparatus for processing plastic materials, comprising a tubular stator member; an elongated rotor member extending through and rotatable in said stator member and defining an input section, a processing section and an output section lengthwise of the stator member; there being generally continuous backing surface means on one of said members in said processing section and vaned scraper surface means on the other member engageable with said backing surface means along a line of angular contact to define generally longitudinal channel means of uniform angularity through the processing section; said scraper means having a substantially lower friction coefficient means than said backing surface means with reference to said material; an opening in said surface means communicating with said channel means and means connecting the opening with vacuum source; and means for feeding material to said input section and for withdrawing processed material from said output section at a rate so low as to incompletely fill said channel means; whereby the material will be subjected in said processing section to a steep negative pressure gradient and an accompanying rolling and kneading action due to differential friction against said backing and scraper surface means for positively expelling gaseous and volatile inclusions from said material as they are presented to said vacuum.

4. Apparatus as claimed in claim 3, wherein said backing surface means comprises a surface of revolution selected from within the group consisting of cylindrical and frusto-conical surfaces, and said scraper surface means comprise helicoidal vaned surface means having edge portions engaging said surface of revolution under a constant angle less than 90°.

5. Apparatus as claimed in claim 4, wherein said helicoidal scraper surface means has a polygonal cross sectional configuration.

6. Apparatus as claimed in claim 4, wherein said helicoidal scraper surface means has a cross sectional configuration in the general form of a square having its sides extended in one direction to provide four extension arms in a generally swastika-like configuration, and said rotor member is rotated in a direction to advance said extension arms in trailing relationship.

7. Apparatus for simultaneously milling and degassing a plastic material comprising a stator structure and a rotor structure having cooperating surfaces defining a working space therebetween; said surface of one of the structures being a surface of revolution selected from within the group consisting of cylindrical and frustoconical surfaces and said surface of the other structure being a helicoidal surface meeting with the first surface under a finite, constant angle less than 90° throughout the longitudinal extent of said working space; the second surface having a substantially lower friction coefficient with respect to said material than the friction coefficient of the first surface; means connecting said working space with a source of vacuum; means for feeding material into said working space at a rate so low that said space is incompletely filled therewith; and means for rotating the rotor structure in a direction to advance the material through said space by rolling and kneading the material between said surfaces due to said friction coefficient relationship and so as to present continually renewed portions of material to said vacuum.

8. Apparatus for simultaneously milling and degassing a plastic material comprising a stator having a generally cylindrical inner surface and a rotor having a helicoidally vaned outer surface defining a working space with said stator surface; said rotor surface meeting with said stator surface under a finite, constant angle throughout the longitudinal extent of the working space; the rotor surface having a substantially lower friction coefficient with respect to the material than the friction coefficient of the stator surface; means connecting said working space with a source of vacuum; means for feeding material into said working space at a rate so low that said space is incompletely filled therewith; and means for rotating the rotor in a direction to advance the material through said space while rolling and kneading it between said surfaces due to said friction coefficient relationship and so as to present continually renewed portions of material to said vacuum.

9. Apparatus for simultaneously milling and degassing a plastic material comprising a rotor having a generally cylindrical outer surface and a stator having a helicoidally vaned inner surface defining a working space with said rotor surface; said stator surface meeting with said rotor surface under a finite, constant angle throughout the longitudinal extent of the working space; the stator surface having a substantially lower friction coefficient with respect to the material than the friction coefficient of the rotor surface; means connecting the working space with a source of vacuum; means for feeding material into the working space at a rate so low that said space is incompletely filled therewith; and means for rotating the rotor in a direction to advance the material through said space while rolling and kneading it between said surfaces due to said friction coefficient relationship and so as to present continually renewed portions of material to said vacuum.

References Cited by the Examiner
UNITED STATES PATENTS

| | | | |
|---|---|---|---|
| 1,138,410 | 5/15 | Pointon | 18—2 |
| 1,283,947 | 11/18 | Steinle | 18—12 |
| 1,836,355 | 12/31 | Banbury | 18—2 |
| 1,936,248 | 11/33 | Lash et al. | 18—2 |
| 2,368,102 | 1/45 | Bowman | 18—2 |
| 2,438,281 | 3/48 | Gordon | 18—48 |
| 2,519,014 | 8/50 | Bankey | 18—2 |
| 2,694,224 | 11/54 | Rhodes | 18—2 |
| 2,698,962 | 1/55 | Swallow | 18—2 |
| 2,702,410 | 2/55 | Brown | 18—48 |
| 2,744,287 | 5/56 | Parshall et al. | 18—12 |
| 2,765,490 | 10/56 | Zona | 18—12 |
| 2,803,039 | 12/57 | Marshall | 18—2 |
| 2,817,876 | 12/59 | Gandellli et al. | 18—12 |
| 2,894,280 | 7/59 | Juve | 18—2 |
| 2,977,098 | 3/61 | Watson | 18—2 XR |

WILLIAM J. STEPHENSON, *Primary Examiner.*